United States Patent
Hassager et al.

(10) Patent No.: US 11,228,857 B2
(45) Date of Patent: Jan. 18, 2022

(54) DYNAMIC CUSTOMIZATION OF HEAD RELATED TRANSFER FUNCTIONS FOR PRESENTATION OF AUDIO CONTENT

(71) Applicant: Facebook Technologies, LLC, Menlo Park, CA (US)

(72) Inventors: Henrik Gert Hassager, Seattle, WA (US); Sebastià Vicenç Amengual Gari, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/774,856

(22) Filed: Jan. 28, 2020

(65) Prior Publication Data

US 2021/0099826 A1    Apr. 1, 2021

Related U.S. Application Data

(60) Provisional application No. 62/907,603, filed on Sep. 28, 2019.

(51) Int. Cl.
*H04S 7/00* (2006.01)
*H04R 5/033* (2006.01)
(Continued)

(52) U.S. Cl.
CPC .......... *H04S 7/304* (2013.01); *G06K 9/00335* (2013.01); *H04R 5/033* (2013.01);
(Continued)

(58) Field of Classification Search
None
See application file for complete search history.

(56) References Cited

U.S. PATENT DOCUMENTS

| 9,848,273 B1 * | 12/2017 | Helwani | H04R 25/552 |
| 2013/0141468 A1 * | 6/2013 | Coon | G09G 5/00 345/661 |

(Continued)

FOREIGN PATENT DOCUMENTS

| GB | 2542609 A | 3/2017 |
| WO | WO 2017/198156 A1 | 11/2017 |

OTHER PUBLICATIONS

Majdak, P. et al. "Multiple exponential sweep method for fast measurement of head-related transfer functions," Journal of the Audio Engineering Society, 2007, vol. 55, No. 7/8, pp. 623-637.

(Continued)

*Primary Examiner* — James K Mooney
(74) *Attorney, Agent, or Firm* — Fenwick & West LLP

(57) ABSTRACT

A system for dynamically updating a head-related transfer function (HRTF) model that is customized to a user. The system receives one or more images of the user captured by one or more imaging devices. The system determines a pose of the user using the one or more captured images. The pose of the user includes a head-torso orientation of the user. The system updates a HRTF model for the user based on the determined pose including the head-torso orientation. The system generates one or more sound filters using the updated HRTF model and applies the one or more sound filters to audio content to generate spatialized audio content. The system provides the spatialized audio content to the user.

20 Claims, 7 Drawing Sheets

(51) Int. Cl.
*H04S 3/00* (2006.01)
*H04R 5/04* (2006.01)
*G06K 9/00* (2006.01)

(52) U.S. Cl.
CPC .............. *H04R 5/04* (2013.01); *H04S 3/008* (2013.01); *H04S 2400/01* (2013.01); *H04S 2400/11* (2013.01); *H04S 2420/01* (2013.01)

(56) References Cited

U.S. PATENT DOCUMENTS

| | | |
|---|---|---|
| 2017/0272890 A1* | 9/2017 | Oh .......................... H04S 7/304 |
| 2017/0332186 A1* | 11/2017 | Riggs ..................... H04S 7/301 |
| 2018/0220253 A1* | 8/2018 | Karkkainen ......... H04R 1/1041 |
| 2020/0142667 A1* | 5/2020 | Querze ................... G06F 3/013 |

OTHER PUBLICATIONS

Algazi, V.R. et al., "Approximating the head-related transfer function using simple geometric models of the head and torso," CIPIC, Center for Image Processing and Integrated Computing, Aug. 1, 2002, pp. 2053-2064.
Brinkmann, F. et al., "Audibility of head-above-torso orientation in head-related transfer functions," Forum Acusticum, Sep. 2014, 6 pages.
PCT International Search Report and Written Opinion, PCT Application No. PCT/US2020/052062, dated Dec. 23, 2020, nine pages.
Usman, M. et al. "3D Sound Generation Using Kinect and HRTF." 2017 IEEE $2^{nd}$ International Conference on Signal and Image Processing, Aug. 4-6, 2017, pp. 307-310.

\* cited by examiner

DYNAMIC CUSTOMIZATION OF HEAD RELATED TRANSFER FUNCTIONS FOR PRESENTATION OF AUDIO CONTENT

CROSS REFERENCE TO RELATED APPLICATION

This application claims the benefit of and priority to U.S. Provisional Application No. 62/907,603, filed on Sep. 28, 2019, which is incorporated by reference herein in its entirety.

FIELD OF INVENTION

This disclosure relates generally to binaural audio synthesis, and more specifically to dynamically customizing head-related transfer functions (HRTFs) for presentation of audio content.

BACKGROUND

A sound from a given source received at two ears can be different, depending on a direction and location of the sound source with respect to each ear. A HRTF characterizes sound received at an ear of a person for a particular location and frequency of the sound source. A HRTF model is used to characterize how a person perceives sound. For users of an audio system, one or more HRTF models may be used to present audio content that is customized for a particular user.

SUMMARY

A system for dynamically customizing a head-related transfer function (HRTF) model to a user of an audio system (e.g., may be implemented as part of a headset). The system includes a server and an audio system. In one embodiment, the server determines a template HRTF model and a customized HRTF model of the user. The server may provide the template HRTF model and/or the customized HRTF model to the audio system. In some embodiments, the audio system determines the template HRTF model and the customized HRTF model. The template HRTF model and the customized HRTF model include both static and dynamic components. One or both of the components may be modified (e.g., add one or more notches) based on the pose of the user such that that a HRTF model may be customized for that user. For instance, as the pose of the user changes, the dynamic component of the HRTF model is updated accordingly. The components may be modified at a fast rate with low latency (e.g., less than 20 milliseconds). The dynamically updated HRTF model is utilized by the audio system for presentation of spatialized audio content to the user.

In some embodiments, a method is disclosed for dynamically customizing a HRTF model by an audio system. The method comprises receiving one or more images of a user captured by one or more imaging devices. The audio system determines a pose of the user using the one or more captured images. The pose of the user includes a head-torso orientation. The audio system updates the HRTF model for the user based on the determined pose including the head-torso orientation. The audio system generates one or more sound filters using the updated HRTF model. The one or more sound filters are applied to audio content to generate spatialized audio content. The audio system provides the spatialized audio content to the user. In some embodiments, a non-transitory computer readable medium configured to store program code instructions is disclosed that when executed by a processor, cause the processor to perform the steps described above.

In some embodiments, an audio system is disclosed for dynamically customizing a HRTF model for a user. The audio system comprises a transducer array (e.g., one or more speakers) configured to present spatialized audio content to the user. The audio system further comprises a controller. The controller is configured to receive one or more images of the user captured by one or more imaging devices. The controller determines a pose of the user using the one or more captured images. The pose of the user includes a head-torso orientation. The controller further updates the HRTF model for the user based on the determined pose. The controller generates one or more sound filters using the updated HRTF model. The one or more sound filters are applied by the controller to audio content to generate spatialized audio content. The controller further provides the spatialized audio content to the user via the transducer array.

Figure 1A:
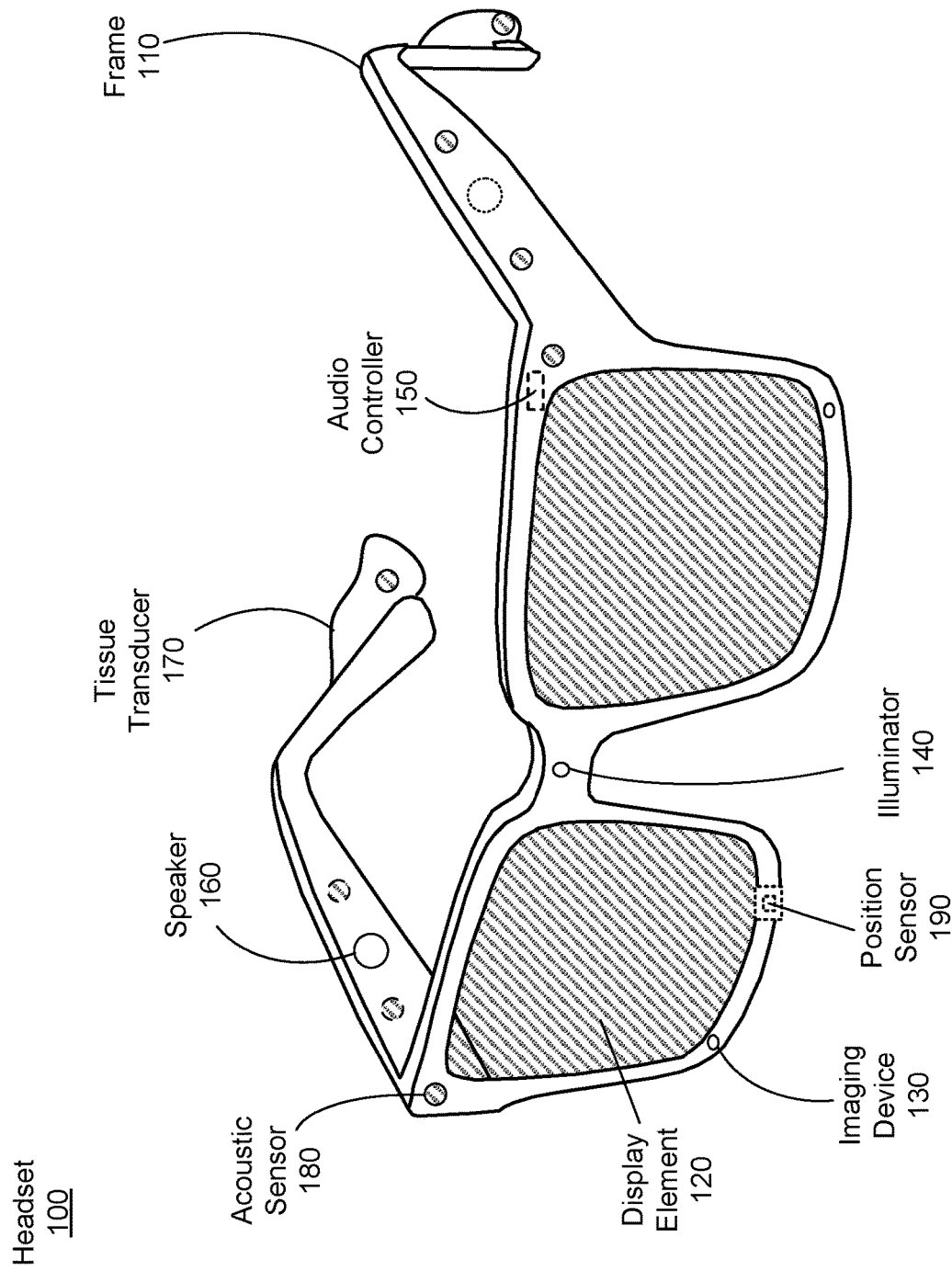
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A system environment configured to dynamically customize a head-related transfer function (HRTF) model. A HRTF characterizes sound received at an ear of a person for a particular location of a sound source. A HRTF model is used to characterize how a user (e.g., of an audio system and/or headset) perceives sound. The HRTF model for a particular sound source direction relative to the user may be unique to the user (i.e., a customized HRTF model) based on the user's pose, as the pose affects how sound arrives at the user's ear canal. The pose of the user describes a position and position of an anatomy of the user. The pose may describe, e.g., a torso shape, a torso size, a head shape, a head size, ear shapes for one or both ears, ear sizes for one or both ears, other shapes and/or sizes of part of the user, a head-torso orientation, ear-torso orientation (for one or both ears), or some combination thereof. Note that head-torso orientation describes an orientation of the head relative to the torso. In some embodiments, the ear-torso orientation for one or both ears (left and right) may be determined from the head-torso orientation. The customized HRTF model associated with a pose for a specific user includes features (e.g., notches) that act to customize the HRTF model for that specific user. Current methods for customizing HRTF models for a user do not take into account the effects of changing a position of the head relative to the torso or break apart the HRTF model into customizable components.

A customized HRTF model is generated using a template HRTF model and applying one or more filters to the template HRTF model. The one or more filters are determined by the pose of the user. Accordingly, the one or more filters act to customize the HRTF model to the user by introducing one or more notches at appropriate frequency locations, with appropriate frequency band widths centered around the frequency locations, and with appropriate attenuation values in the frequency band at the frequency locations. A notch may be viewed as the result of the resonances in the acoustic energy as it arrives at the head of the listener and bounces around the torso, head, and pinna undergoing cancellations before reaching the entrance of the ear canal. As noted above, notches can affect how a person perceives sound (e.g., from what elevation relative to the user a sound appears to originate).

The customized HRTF model is updated as the pose of the user changes. For example, as the user moves throughout their environment, the user's anatomy positions (e.g., the head-torso orientation and/or the ear-torso orientation) changes. The customized HRTF model updates dynamically as the orientations change. For example, as a user tilts their head from left to right (i.e., a change in roll), as a user tilts their head up or down (i.e. a change in pitch), and/or as a user turns their head from left to right (i.e. a change in yaw), sound may reflect off of the user's torso differently. The reflected sound arrives at each ear of the user differently. The updated customized HRTF model takes into account the changes in how the user hears the reflected sound. In another example, over time, the user's anatomy geometry may change (e.g., the user may lose weight and their torso shape and/or size is changed). In this example, the customized HRTF model updates dynamically in accordance with the monitored changes.

The system environment includes a server and an audio system (e.g., the server and audio system may be fully or partially implemented as part of a headset, the server and audio system may be separate and external to the headset, etc.). The server may receive feature data describing features of a user and/or the headset, in accordance with one or more privacy settings of the user. For example, the server may be provided with images and/or video of the user's torso, head, and ears, anthropometric measurements of the torso, head, and ears, etc. The server determines values for one or more individualized filters (e.g., add notches) based at least in part on the received data. For example, the server may utilize machine learning to identify values for the one or more individualized filters based on the received data. The server generates the customized HRTF model for the user based on the template HRTF model and the individualized filters (e.g., determined values for the one or more individualized notches). The server may provide the template HRTF model, the customized HRTF model and/or the individualized filters to the audio system (e.g., may be part of a headset) associated with the user. In some embodiments, the audio system receives feature data and generates the customized HRTF model for the user.

In some embodiments, the audio system receives the HRTF model from the server and receives feature data describing features of the user (e.g., the images and/or video of the user's torso, head, and ears, the anthropometric measurements, inertial measurement unit (IMU) measurements, etc.). The audio system determines a pose of the user using the received feature data. The audio system may update the received HRTF model (i.e., further customizing the HRTF model) for the user based on the determined pose (e.g., by applying one or more individualized filters based on the determined pose). The audio system generates one or more sound filters using the updated HRTF model and applies the sound filters to audio content to generate spatialized audio content. The audio system may then provide (e.g., via a transducer array) the spatialized audio content to the user. The spatialized audio content appears to be originating from one or more target sound source directions.

In some embodiments, some or all of the functionality of the server is performed by the audio system. For example, the server may provide the template HRTF model to the audio system and the audio system may determine values for one or more individualized filters and generate the customized HRTF model based on the template HRTF model and the individualized filters. In some embodiments, some of the functionality of the audio system is performed by the server. For example, the customized HRTF is updated by the server based on the determined pose (e.g., by applying one or more individualized filters based on the determined pose).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Example Headsets

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. In one embodiment, the captured images may include one or more images and/or videos of the user of the headset 100 (e.g., the user wears the headset 100 and stands in front of a mirror). In some embodiments, the captured images may include one or more images and/or videos of one or more separate headset users (e.g., the headset 100 captures images of the local area that includes multiple headset users). As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. In some embodiments, the transducer array presents spatialized audio content based on one or more sound filters. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to determine pose of the user, generate head-related transfer functions (HRTFs), dynamically update HRTFs, generate direction of arrival (DOA) estimates, track the location of sound sources, form beams in the direction of sound sources, classify sound sources, generate sound filters for the speakers 160, or some combination thereof. The audio controller 150 is described in more detail in conjunction with FIG. 3.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

The audio system dynamically updates a customized HRTF model for the user. The audio system receives one or more images of the user captured by one or more imaging devices (e.g., the one or more imaging devices 130). The audio system determines a pose (e.g., torso shape, ear shape, head-torso orientation, etc.) of the user based on the captured images. The audio system dynamically updates the customized HRTF model based on the determined pose. The audio system generates one or more sound filters using the updated HRTF model and applies the sound filters to audio content to generate spatialized audio content. The audio system provides the spatialized audio content to the user via the speakers 160. The process for dynamically customizing a HRTF model is further described with reference to FIGS. 3-5.

Figure 1B:
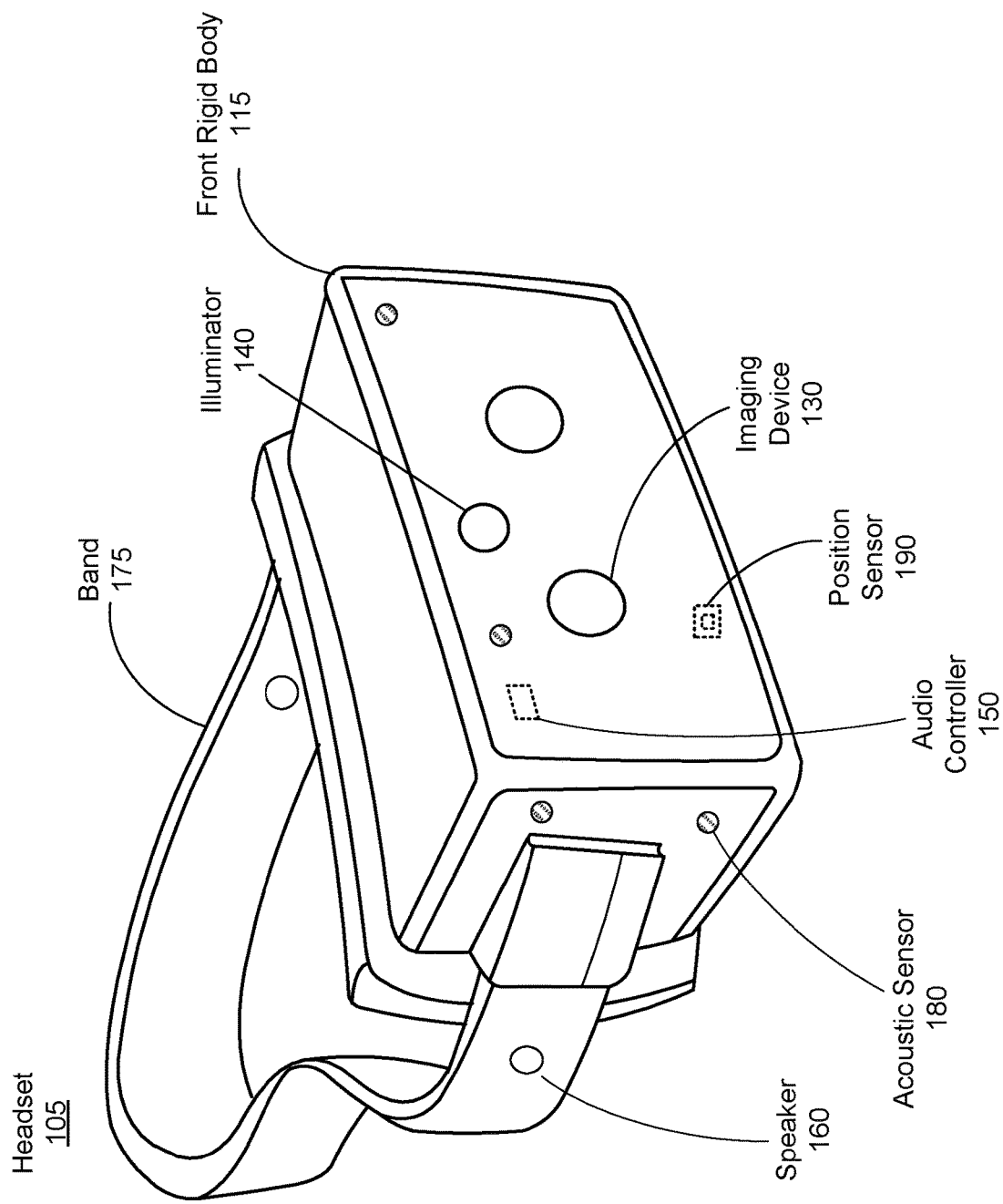
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, the audio system of FIG. 1A, and the position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

System Overview

Figure 2:
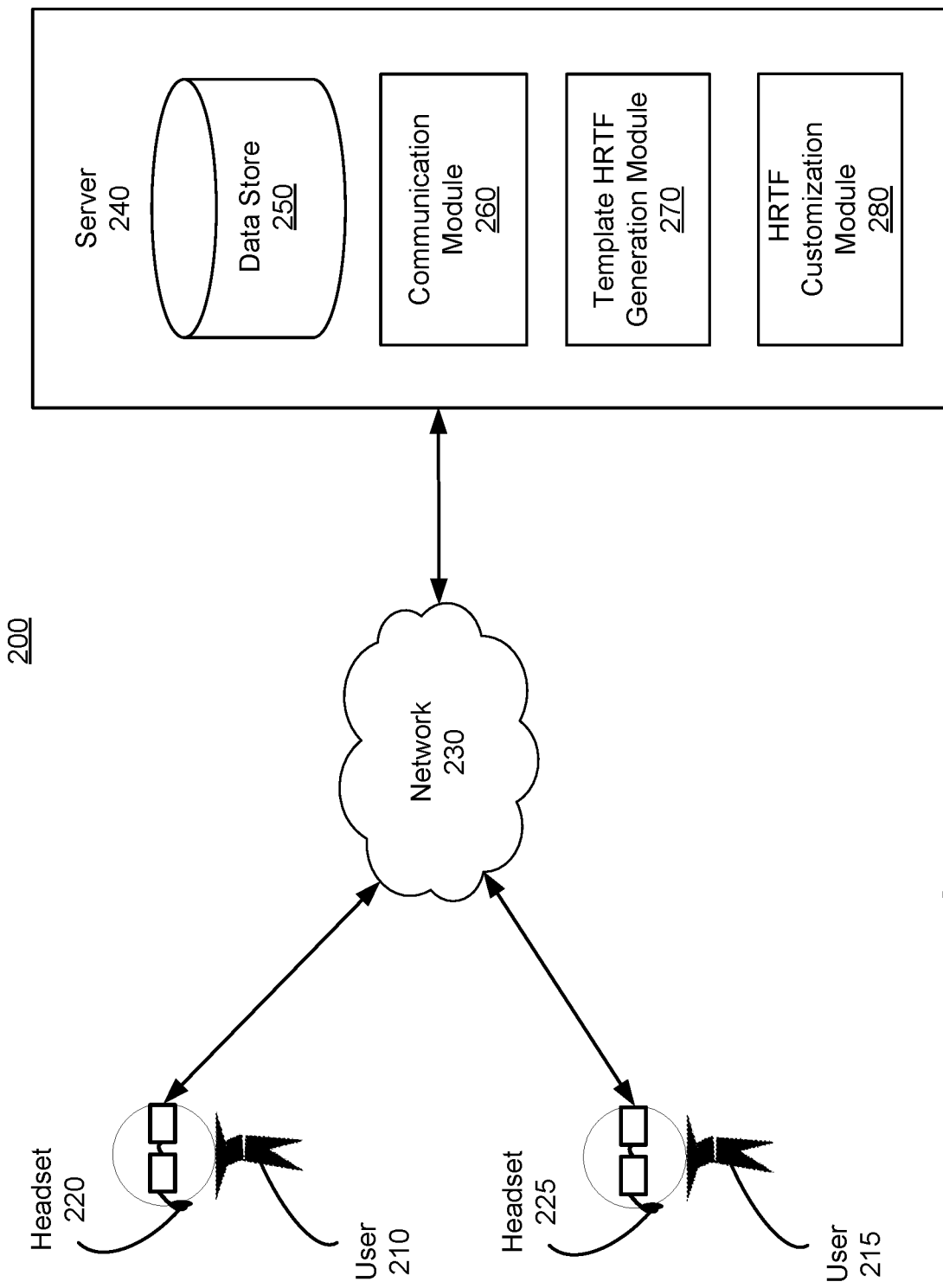
FIG. 2 is a schematic diagram of a high-level system environment for generating a customized HRTF model, in accordance with one or more embodiments.

FIG. 2 is a schematic diagram of a system environment 200 for generating a customized HRTF model, in accordance with one or more embodiments. The system environment 200 includes one or more headsets (e.g., headset 220, headset 225) and a server 240. The one or more headsets communicate with the server 240 through a network 230. Each headset 220 and headset 225 may be worn by a user (e.g., user 210, user 215, respectively). The headsets in FIG. 1A or FIG. 1B may be an embodiment of the headset 220 and headset 225.

The network 230 couples the one or more headsets to the server 240. The network 230 may include any combination of local area and/or wide area networks using both wireless and/or wired communication systems. For example, the network 230 may include the Internet, as well as mobile telephone networks. In one embodiment, the network 230 uses standard communications technologies and/or protocols. Hence, the network 230 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 230 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 230 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server 240 may receive feature data via the network 230 from one or more devices (e.g., the headset 220), in accordance with one or more privacy settings of the user. Feature data describes a size, shape, position, and orientation of the torso, head, and ears of a user. Feature data may include, for example, one or more images of a torso, one or more images of a head, one or more images of ears of the user, one or more videos of the torso, one or more videos of the head, one or more videos of the ears of the user, anthropometric measurements of the torso, anthropometric measurements of the head, anthropometric measurements of the ears of the user, one or more images of the user's head wearing a headset, one or more images of the headset in isolation (e.g., not worn by the user), one or more videos of the user's head wearing the headset, one or more videos of the headset in isolation (e.g., not worn by the user), or some combination thereof. Anthropometric measurements of the user are measurements of the torso, head, and/or ears of the user. These measurements may include the head-torso orientation, the ear-torso orientation, the height (or length) of the torso, the width of the torso, the height (or length) of the head, the width of the head, the height (or length) of the left and right ear, the width of left and right ear, the left and right ear cavum concha height, the left and right ear cavum concha width, the left and right ear cymba height, the left and right ear fossa height, the left and right ear pinna height and width, the left and right ear intertragal incisure width, other related anatomical measurements, or some combination thereof. In some embodiments, the anthropometric measurements may be measured using measuring instruments like a measuring tape and/or ruler. In some embodiments, images and/or videos of the torso, head, and/or ears of the user are captured using an imaging device (not shown). The imaging device may be a camera on the headset 220, a camera on the headset 225, a depth camera assembly (DCA) that is part of the headset 220, a DCA that is part of the headset 225, an external camera (e.g., part of a separate mobile device), an external DCA, some other device configured to capture images and/or depth information, or some combination thereof. In some embodiments, the imaging device is also used to capture images of the headset.

The feature data is provided, in accordance with the user's privacy settings, to the server 240 via the network 230. In the illustrated example, the feature data is provided from the one or more headsets via the network 230 to the server 240. However, in alternative embodiments, some other device (e.g., a mobile device (e.g., a smartphone, tablet, etc.), a desktop computer, an external camera, etc.) may be used to upload the feature data to the server 240. The user may adjust privacy settings to allow or prevent the headset 220 or the headset 225 from transmitting information to the server 240. For example, the user may elect to keep all information on the headset and not transmit any data to the server 240. In this case, some or all of the computing may take place locally on the headset.

To capture the torso and/or head of the user 210 more accurately, the user 210 (or some other party, e.g., the user 215) positions an imaging device in different positions relative to the torso and/or head of the user 210, such that captured images cover, in accordance with one or more privacy settings of the user 210, different portions of the torso and/or head of the user 210. The user 210 may hold the imaging device at different angles and/or distances relative to the user 210. In one example, the user 210 may hold the imaging device at arm's length directly in front of the face of the user 210 and use the imaging device to capture images of the face of the user 210. In another example, when the imaging device is a camera on the headset 220, the user 210 may wear the headset 220 and stand in front of a mirror and use the imaging device to capture images of the reflection of the user 210. In some embodiments, the imaging device may run, in accordance with one or more privacy settings of the user 210, a feature recognition software and capture, in accordance with the privacy settings, an image automatically when features of interest (e.g., ear, shoulder) are recognized in the captured images. In some embodiments, the imaging device may capture an image when the device receives an input from the user to capture the image.

The server 240 uses the feature data of the user along with a template HRTF model to generate customized HRTF models for the user 210. The server 240 includes various components, including, e.g., a data store 250, a communication module 260, a template HRTF generation module 270, and a HRTF customization module 280. Some embodiments of the server 240 have different components than those described here. Similarly, the functions can be distributed among the components in a different manner than is described here. And in some embodiments, one or more functions of the server 240 may be performed by other components (e.g., an audio system of a headset).

The data store 250 stores data for use by the server 240. Data in the data store 250 may include, e.g., one or more template HRTF models, one or more customized HRTF models, individualized filters (e.g., individualized sets of filter parameter values), user profiles, feature data, other data relevant for use by the server system 240, or some combination thereof. In some embodiments, the data store 250 may periodically receive and store updated template HRTF models.

The communication module 260 communicates with one or more headsets (e.g., the headset 220 and/or the headset 225). In some embodiments, the communications module 260 may also communicate with one or more other devices (e.g., an imaging device, a smartphone, etc.). The user 210 and/or the user 215 may adjust privacy settings to allow or prevent the headset 220 and the headset 225, respectively, from transmitting information to the server 240. The communication module 260 may communicate via, e.g., the network 230 and/or some direct coupling (e.g., Universal Serial Bus (USB), WIFI, etc.). The communication module 260 may receive a request from a headset (e.g., the headset 220) for a customized HRTF model for a particular user (e.g., the user 210), feature data (from the headset and/or some other device), or some combination thereof. The communication module 260 may also provide one or more customized HRTF models, one or more individualized sets of filter parameter values (i.e., values that describe the one or more filters to be applied to the HRTF models), one or more template HRTF models, or some combination thereof, to a headset (e.g., the headset 220). The communication module 260 may receive an updated HRTF model from the headset.

The template HRTF generation module 270 generates a template HRTF model. In some embodiments, there is a single template HRTF model for all users. In alternate embodiments, there are a plurality of different template HRTF models, and each template HRTF model is directed to different groups that have one or more common characteristics (e.g., pose, gender, age, etc.). In some embodiments, each template HRTF model is associated with specific characteristics. The characteristics may be, e.g., pose, gender, age, some other characteristic that affects how a person perceives sound, or some combination thereof. For example, there may be different template HRTF models based on variation in head size and/or age (e.g., there may be a template HRTF model for children and a different template HRTF model for adults). In another example, there may be different template HRTF models based on variations in head-torso orientation and/or head shape (e.g., there may be a template HRTF model for a person with a round head shape tilted at a 15 degree angle in reference to their torso and a different template HRTF model for a person with an oval head shape tilted at the same 15 degree angle). In some embodiments, the template HRTF generation module 270 uses feature data of the user 210 to determine one or more characteristics that describe the user 210. The template HRTF generation module 270 may then select a template HRTF model based on the one or more characteristics.

In some embodiments, the template HRTF model is made up of a plurality of customizable, individual templates. The individual templates may include a torso template, a head template, and multiple ear templates (e.g., a helix template, an antihelix template, a concha bowl template, etc.). The template HRTF generation module 270 uses feature data of the user 210 to determine one or more characteristics that describe the user 210. The template HRTF generation module 270 selects specific individual templates that are combined to make up the template HRTF model for the user 210 based on the one or more characteristics that describe the user 210.

In some embodiments, the HRTF generation module 270 generates a template HRTF model from a generic HRTF model based on the one or more characteristics. The generic HRTF model is associated with some population of users and may include one or more notches. A notch in the generic HRTF model corresponds to a change in amplitude over a frequency window or band. A notch is described by the following frequency attenuation characteristics: a frequency location, a width of a frequency band centered around the frequency location, and a value of attenuation in the frequency band at the frequency location. In some embodiments, a notch in an HRTF model is identified as the location of frequency where the change in amplitude is above a predefined threshold. Accordingly, notches in a generic HRTF model can be thought to represent average attenuation characteristics as a function of frequency and direction for the population of users.

The template HRTF generation module 270 removes notches in the generic HRTF model over some or all of an entire audible frequency band (range of sounds that humans can perceive) to form a template HRTF model. The template HRTF generation module 270 may also smooth the template HRTF model such that some or all of it is a smooth and continuous function. In some embodiments, the template HRTF model is generated to be a smooth and continuous function lacking notches over some frequency ranges, but not necessarily lacking notches outside of those frequency ranges. In some embodiments, the template HRTF model is such that there are no notches that are within a frequency range of 5 kHz-16 kHz. This may be significant because notches in this frequency range tend to vary between different users. This means that, at a frequency range of approximately 5 kHz-16 kHz, notch number, notch size, notch location, may have strong effects regarding how acoustic energy is received at the entry of the ear canal (and thus can affect user perception). Thus, having a template HRTF model as smooth and continuous function with no notches at this frequency range of approximately 5 kHz-16 kHz makes it a suitable template that can then be individualized for different users. In some embodiments, the template HRTF generation module 270 generates an HRTF template model to be a smooth and continuous function lacking notches at all frequency ranges. In some embodiments, template HRTF generation module 270 generates an HRTF that is smooth and continuous function over one or more bands of frequencies, but may include notches outside of these one or more bands of frequencies. For example, the template HRTF generation module 270 may generate a template HRTF model that lacks notches over a frequency range (e.g., approximately 5 kHz-16 kHz), but may include one or more notches outside of this range.

Note that the generic HRTF model used to generate the template HRTF model is based on a population of users. In some embodiments, the population may be selected such that it is representative of most users, and a single template HRTF model is generated from the population based on the one or more characteristics of a particular user and is used to generate some or all customized HRTF models.

In other embodiments, multiple populations are used to generate different generic HRTF models, and the populations are such that each are associated with one or more common characteristics. For example, one population may be for adults, one population for children, one population for men, one population for women, etc. The template HRTF generation module 270 may generate a template HRTF model for one or more of the plurality of generic HRTF models. Accordingly, there may be a plurality of different template HRTF models, and each template HRTF model is directed to different groups that share some common set of characteristics.

In some embodiments, the template HRTF generation module 270 may periodically generate a new template HRTF model and/or modify a previously generated template HRTF model as more population HRTF data is obtained. In one example, the template HRTF generation module 270 receives an updated HRTF model from an audio system (e.g., an audio system integrated on the headset 220) via the communication module 260 and modifies a previously generated template HRTF model accordingly. The template HRTF generation module 270 may store each newly generated template HRTF model and/or each update to a template HRTF model in the data store 250. In some embodiments, the server 240 may send a newly generated template HRTF model and/or an update to a template HRTF model to the headset 220.

The HRTF customization module 280 may determine one or more filters that are individualized to the user based at least in part on feature data associated with a user. A filter may be, e.g., a band pass (e.g., describes a peak), a band stop (e.g., describes a notch), a high pass (e.g., describes a high frequency shelf), a low pass (e.g., describes a low frequency shelf), a comb filter (e.g., describes regularly spaced notches), or some combination thereof. The filters may include, e.g., one or more filter parameter values that are individualized to the user. Parameter values may include, e.g., a frequency location, a width of a frequency band centered around the frequency location (e.g., determined by a quality factor and/or filter order), and depth at the frequency location (e.g., gain). Depth at the frequency location refers to a value of attenuation in the frequency band at the frequency location. A single filter or combinations of filters may be used to describe one or more notches.

The HRTF customization module 280 employs a trained machine learning (ML) model on the feature data of the user to determine individualized filter parameter values (e.g., filter parameter values) for one or more individualized filters (e.g., notches) that are customized to the user. In some embodiments, the individualized filter parameter values are parameterized by sound source elevation and azimuth angles. The ML model is first trained using data collected from a population of users. The collected data may include, e.g., feature data and acoustic data. The feature data may include features of the user and/or the headset. The acoustic data may include HRTF models measured using audio measurement apparatus and/or simulated via numerical analysis from three dimensional scans of the head of the user. The training may include supervised or unsupervised learning algorithms including, but not limited to, linear and/or logistic regression models, neural networks, classification and regression trees, k-means clustering, vector quantization, or any other machine learning algorithms. In some embodiments, the filters and/or filter parameter values are derived via machine learning directly from image and/or video data of a user that correspond to single or multiple images that capture the pose of the user taken by a camera (in a phone or otherwise). In some embodiments, the filters and/or filter parameter values are derived from anthropometric measurements of the user that correspond to the pose of the user. In some embodiments the filters and/or filter parameter values are derived from weighted combinations of images, videos, and anthropometric measurements.

In some embodiments, the ML model uses a convolutional neural network model with layers of nodes, in which values at nodes of a current layer are a transformation of values at nodes of a previous layer. A transformation in the model is determined through a set of weights and parameters connecting the current layer and the previous layer. In some examples, the transformation may also be determined through a set of weights and parameters used to transform between previous layers in the model.

The input to the neural network model may be some or all of the features data of a user along with a template HRTF model encoded onto the first convolutional layer, and the output of the neural network model is filter parameter values for one or more individualized notches to be applied to the template HRTF model as parameterized by elevation and azimuth angles for the user; this is decoded from the output layer of the neural network. The weights and parameters for the transformations across the multiple layers of the neural network model may indicate relationships between information contained in the starting layer and the information obtained from the final output layer. For example, the weights and parameters can be a quantization of user characteristics, etc. included in information in the user image data. The weights and parameters may also be based on historical user data.

The ML model can include any number of machine learning algorithms. Some other ML models that can be employed are linear and/or logistic regression, classification and regression trees, k-means clustering, vector quantization, etc. In some embodiments, the ML model includes deterministic methods that have been trained with reinforcement learning (thereby creating a reinforcement learning model). The model is trained to increase the quality of the individualized sets of filter parameter values generated using measurements from a monitoring system within an audio system at the headset (e.g., the headset 220).

The HRTF customization module 280 selects an HRTF template model for use in generating one or more customized HRTF models for the user. In some embodiments, the HRTF customization module 280 simply retrieves the single HRTF template model (e.g., from the data store 250). In other embodiments, the HRTF customization module 280 determines one or more characteristics associated with the user from the feature data, and uses the determined one or more characteristics to select a template HRTF model from a plurality of template HRTF models. In other embodiments, the HRTF customization module 280 determines one or more characteristics associated with the user from the feature data, and uses the determined one or more characteristics to select individual templates (e.g., a torso template, a head template, a helix template, etc.) and combines the individual templates into a template HRTF model.

The HRTF customization module 280 generates one or more customized HRTF models for a user using the selected template HRTF model and one or more of the individualized filters (e.g., sets of filter parameter values). The HRTF customization module 280 applies the individualized filters (e.g., one or more individualized sets of filter parameter values) to the selected template HRTF model to generate the customized HRTF model. In some embodiments, the HRTF customization module 280 adds at least one notch to the selected template HRTF model using at least one of the one or more individualized filters to generate a customized HRTF model. In some embodiments, to generate a customized HRTF model, the HRTF customization module 280 uses at least one of the individualized filters to add at least one notch to one or more of the individual templates that make up the template HRTF model. In some embodiments, the HRTF customization module 280 uses at least one of the individualized filters to increase or decrease the width of a notch centered around a frequency location to generate a customized HRTF model. In other embodiments, the HRTF customization module 280 uses at least one of the individualized filters to increase or decrease a depth of the notch at a frequency location to generate a customized HRTF model. The one or more individualized filters are applied to static components and dynamic components of the template HRTF model. The static components are associated with features of the pose that substantially remain unchanging over time. For example, unless the user suffers from an injury, the head shape of the user does not change over time. The dynamic components are associated with features of the pose that change over time. For example, the head-torso orientation of the user changes depending on what the actions the user is performing (e.g., brushing their hair, tying their shoe, dancing to music, etc.).

The HRTF customization module 280 continues to customize the HRTF model (i.e., dynamically updating the customized HRTF model). In some embodiments, the HRTF customization module 280 may then provide (via the communication module 260) the one or more customized HRTF models to the headset 220 via the network 230. The audio system (not shown) in the headset 220 stores the customized HRTF models. The audio system in the headset 220 may then update the customized HRTF models to render spatialized audio content to the user 210 such that it would appear to originate from a specific location towards the user 210 (e.g., in front of, behind, from a virtual object in the room, etc.).

In alternate embodiments, the HRTF customization module 280 provides the individualize sets of filter parameter values to the audio system of the headset 220 via the network 230. In this embodiment, the audio system of the headset 220 applies the individualized sets of filter parameter values to a template HRTF model to generate the one or more customized HRTF models. The template HRTF models may be stored locally on the headset 220 and/or retrieved from some other location (e.g., the server 240).

Audio System

Figure 3:
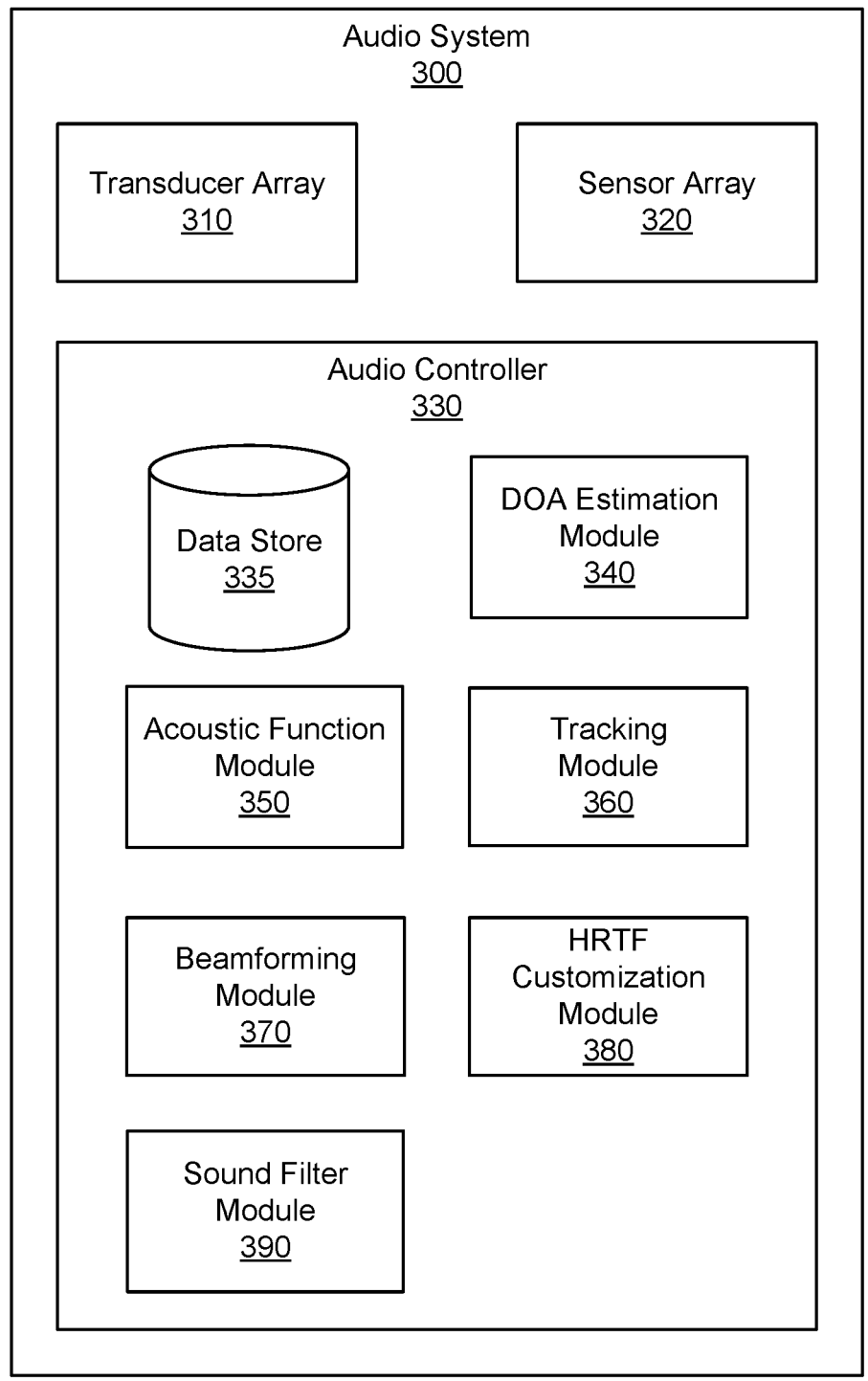
FIG. 3 is a block diagram of an audio system, in accordance with one or more embodiments.

FIG. 3 is a block diagram of an audio system 300, in accordance with one or more embodiments. The audio system in FIG. 1A or FIG. 1B may be an embodiment of the audio system 300. The audio system 300 determines a pose of the user and updates a HRTF model based on the determined pose of the user. The audio system 300 may then use the updated HRTF model to generate one or more sound filters, apply the sound filters to audio content to generate spatialized audio content, and provide the spatialized audio content to the user. In the embodiment of FIG. 3, the audio system 300 includes a transducer array 310, a sensor array 320, and an audio controller 330. Some embodiments of the audio system 300 have different components than those described here. Similarly, in some cases, functions can be distributed among the components in a different manner than is described here.

The transducer array 310 is configured to present audio content. In some embodiments, the transducer array presents spatialized audio content based on one or more sound filters. The transducer array 310 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 310 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 310 generates audio content in accordance with instructions from the audio controller 330. The audio content is spatialized due to one or more sound filters determined by the sound filter module 390. Spatialized audio content is audio content that appears to originate from one or more target sound source directions (e.g., an object in the local area and/or a virtual object). For example, spatialized audio content can make it appear that sound is originating from a virtual singer across a room from a user of the audio system 300. The transducer array 310 may be coupled to a wearable device (e.g., the headset 100 or the headset 105). In alternate embodiments, the transducer array 310 may be a plurality of speakers that are separate from the wearable device (e.g., coupled to an external console).

The sensor array 320 detects sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 320 is configured to monitor the audio content generated by the transducer array 310 using at least some of the plurality of acoustic sensors. Increasing the number of sensors may improve the accuracy of information (e.g., directionality) describing a sound field produced by the transducer array 310 and/or sound from the local area.

The audio controller 330 controls operation of the audio system 300. In the embodiment of FIG. 3, the audio controller 330 includes a data store 335, a DOA estimation module 340, an acoustic function module 350, a tracking module 360, a beamforming module 370, a HRTF customization module 380, and a sound filter module 390. The audio controller 330 may be located inside a headset, in some embodiments. Some embodiments of the audio controller 330 have different components than those described here. Similarly, functions can be distributed among the components in different manners than described here. For example, some functions of the controller may be performed external to the headset. The user may opt in to allow the audio controller 330 to transmit data captured by the headset to systems external to the headset, and the user may select privacy settings controlling access to any such data.

The data store 335 stores data for use by the audio system 300. Data in the data store 335 may include one or more template HRTF models, one or more customized HRTF models, individualized filters (e.g., individualized sets of filter parameter values), user profiles, feature data, sounds recorded in the local area of the audio system 300, audio content, sound source locations, a virtual model of local area, direction of arrival estimates, sound filters, and other data relevant for use by the audio system 300, or any combination thereof.

The DOA estimation module 340 is configured to localize sound sources in the local area based in part on information from the sensor array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 300 is located.

For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 within the local area. The position of the sensor array 320 may be received from an external system (e.g., some other component of a headset, an artificial reality console, a mapping server, a position sensor (e.g., the position sensor 190), etc.). The external system may create a virtual model of the local area, in which the local area and the position of the audio system 300 are mapped. The received position information may include a location and/or an orientation of some or all of the audio system 300 (e.g., of the sensor array 320). The DOA estimation module 340 may update the estimated DOA based on the received position information.

The acoustic function module 350 is configured to generate one or more acoustic transfer functions. Generally, a transfer function is a mathematical function giving a corresponding output value for each possible input value. Based on parameters of the detected sounds, the acoustic function module 350 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the sensor array 320 may differ from user to user due to a person's anatomy (e.g., ear shape, shoulders, etc.) that affects the sound as it travels to the person's ears. Accordingly, the ATFs of the sensor array 320 are personalized for each user of the audio system 300.

The tracking module 360 is configured to track locations of one or more sound sources. The tracking module 360 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to process one or more ATFs to selectively emphasize sounds from sound sources within a certain area while de-emphasizing sounds from other areas. In analyzing sounds detected by the sensor array 320, the beamforming module 370 may combine information from different acoustic sensors to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360. The beamforming module 370 may thus selectively analyze discrete sound sources in the local area. In some embodiments, the beamforming module 370 may enhance a signal from a sound source. For example, the beamforming module 370 may apply sound filters which eliminate signals above, below, or between certain frequencies. Signal enhancement acts to enhance sounds associated with a given identified sound source relative to other sounds detected by the sensor array 320.

The HRTF customization module 380 is configured to dynamically update a HRTF model. In some embodiments, the HRTF customization module 380 in FIG. 3 may perform substantially the same operations as the HRTF customization module 280 in FIG. 2. Additionally, the HRTF customization module 380 updates a dynamic component to the HRTF model.

The HRTF customization module 380 receives feature data (e.g., one or more captured images of a user, one or more videos of the user, etc.). In one embodiment, the feature data is provided to the HRTF customization module 380 by a device separate from the audio system 300. In some embodiments, the audio system 300 is integrated into the same device that provides the feature data to the HRTF customization module 380. In one example, the feature data may include one or more captured images of the reflection of the user. The reflection of the user captured in the one or more images comprises the user's head and torso. In some embodiments, the HRTF customization module 380 may receive feature data that includes one or more measurements from a position sensor (e.g., the position sensor 190). The position sensor (e.g., an inertial measurement unit (IMU)) calculates the estimated position of a device that includes the position sensor. For instance, the position sensor integrated into a headset device may determine the head orientation of a user wearing the headset device. In some embodiments, the position sensor may be integrated on the same device that includes the audio system 300.

The HRTF customization module 380 determines a pose of the user based on the received feature data. The pose of the user describes a position and position of an anatomy of the user. The head-torso orientation describes the positioning of the head of the user to the positioning of the torso. The positioning may be determined by using three-dimensional (3D) coordinate systems. For example, a 3D coordinate system with the center placed in the exact center of the head of the user is used for reference. The user changes the positioning of their head as the user tilts their head from left to right (i.e., a change in roll) the head rotates along the z-axis, as the user tilts their head up or down (i.e. a change in pitch) the head rotates along the x-axis, and as the user turns their head from left to right (i.e. a change in yaw) the head rotates along the y-axis, or some combination thereof. A separate 3D coordinate system with the center placed in the exact center of the torso is used for reference. The user changes the positioning of their torso as the user tilts their torso from left to right (i.e., a change in roll) the torso rotates along the z-axis, as the user tilts their torso up or down (i.e. a change in pitch) the torso rotates along the x-axis, and as the user turns their torso from left to right (i.e. a change in yaw) the torso rotates along the y-axis, or some combination thereof. The positioning of the head (e.g., x1, y1, and z1) to the positioning of the torso (e.g., x2, y2, and z2) may determine the head-torso orientation of the user. This head-torso orientation causes sound to reflect off of the user's torso differently and arrive at the user's ears differently (i.e., the reflected sound arrives at each ear of the user differently).

The pose of the user includes static components and dynamic components. The static components are associated with features of the pose that substantially remain unchanging over time. The dynamic components are associated with features of the pose that change over time. The dynamic components may include the head-torso orientation and ear-torso orientation. In one embodiment, the static components of the pose of the user are determined only once using high-quality images and/or using anthropometric measurements. In some embodiments, the dynamic components of the pose of the user are determined at a fast rate and/or at low latency (less than 20 milliseconds) due to the audio system 300 being integrated into the same device that provides the feature data via sensors located on that device (e.g., position sensors, RGB cameras, etc.).

In one embodiment, the pose of the user may be determined using real-time image processing of the captured images. In one embodiment, the image processing comprises image recognition techniques used to identify the anatomy of the user (e.g., the torso, the shoulders, the head, the ears, the nose, etc.). The location of particular parts of the user's anatomy in the captured images are known as keypoints. In some embodiments, in order to determine the dynamic components of the pose, the distance between the keypoints (e.g., the keypoint associated with the head and the keypoint associated with one shoulder) in each image is measured. In this embodiment, the pose is updated as the distance between the keypoints changes (i.e., either increases or decreases). In one example, the pose is updated based on the distance between the keypoints exceeding a threshold distance.

The HRTF customization module 380 determines filters that are individualized to the user based at least in part on the pose associated with the user. A filter may be, e.g., a band pass, a band stop, a high pass, a low pass, a comb filter, or some combination thereof. The filters may include, e.g., one or more filter parameter values that are individualized to the user. One or more filters may be used to customize the HRTF model. The HRTF customization module 380 may employ a trained machine learning (ML) model on the pose of a user to determine the individualized filter parameter values for one or more individualized filters that are customized to the user. The machine learning model is trained in a similar manner to the ML model described above in reference to FIG. 2.

The HRTF customization module 380 updates a HRTF model based on the one or more individualized filter parameter values. In one embodiment, the HRTF model (e.g., a template HRTF model and/or a customized HRTF model) to be updated may have been provided to the audio system by a server (e.g., the server 240). In some embodiments, the HRTF customization module 380 retrieves the HRTF model (e.g., a template HRTF model) from the data store 335. The HRTF customization module 380 updates the HRTF model for a user using one or more of the individualized filters (e.g., sets of filter parameter values). The HRTF customization module 380 applies the individualized filters (e.g., one or more individualized sets of filter parameter values) to the HRTF model to generate the updated HRTF model. In some embodiments, the HRTF customization module 380 provides the updated HRTF model to the server.

The sound filter module 390 is configured to determine sound filters for the transducer array 310. The sound filter module 390 generates the sound filters using the updated HRTF model determined by the HRTF customization module 380. The sound filters cause the audio content to be spatialized, such that the audio content appears to originate from one or more target sound source directions. In some embodiments, the sound filter module 390 may use the updated HRTF model in combination with acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 390 calculates one or more of the acoustic parameters. In some embodiments, the sound filter module 390 requests the acoustic parameters from a server (e.g., as described below with reference to FIG. 6).

The sound filter module 390 provides the sound filters to the transducer array 310. In some embodiments, the sound filters may cause positive or negative amplification of sounds as a function of frequency. In some embodiments, the sound filters may cause the audio content to become spatialized audio content.

HRTF Model & Updated HRTF Model

Figure 4B:
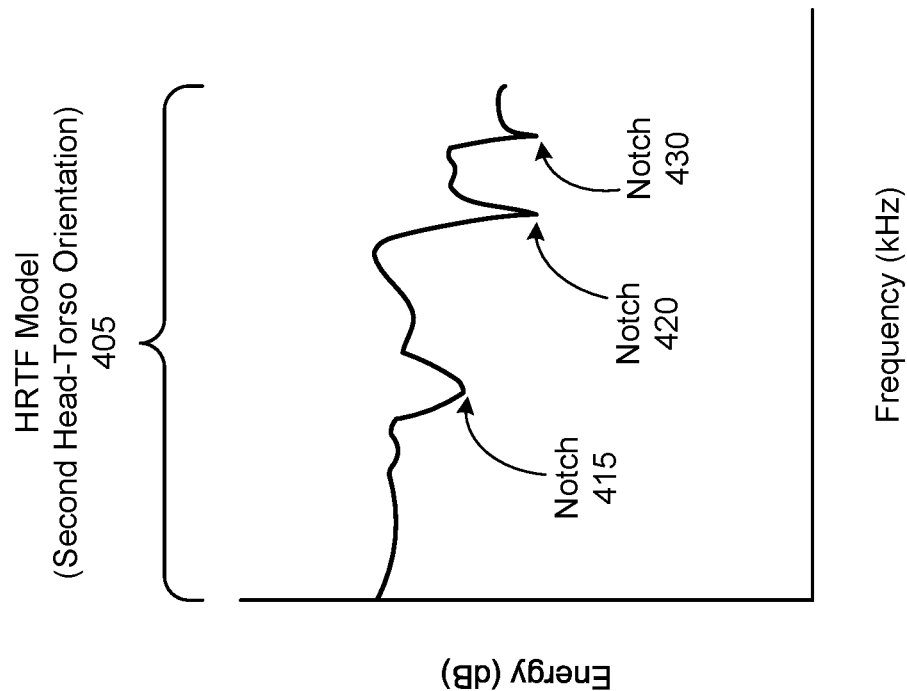
FIG. 4B illustrates an example depiction of an HRTF model for a user in a second head-torso orientation, in accordance with the embodiment in FIG. 4A.
Figure 4A:
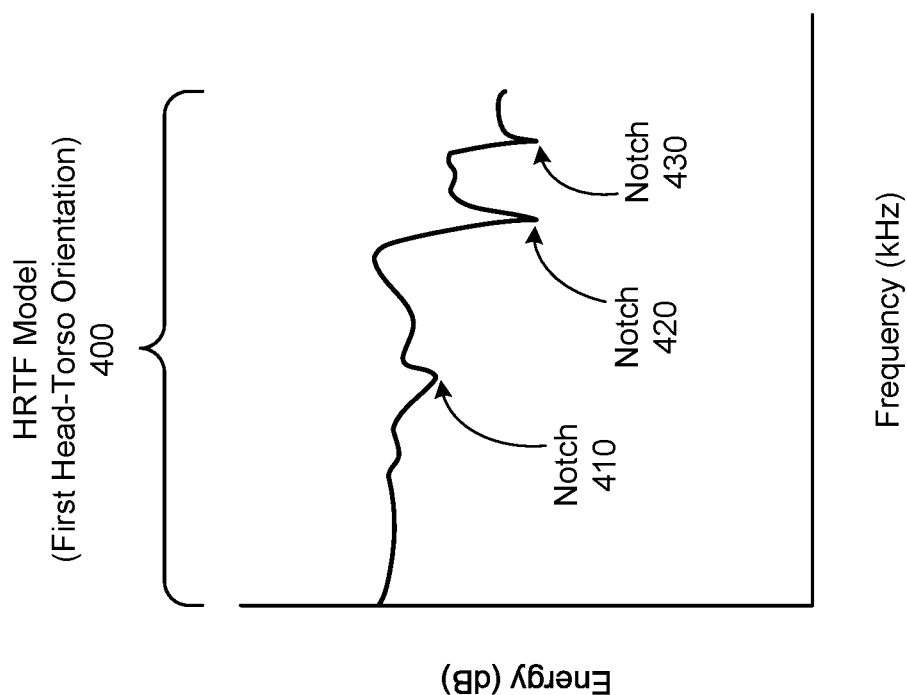
FIG. 4A illustrates an example depiction of a HRTF model for a user in a first head-torso orientation, in accordance with one or more embodiments.

FIG. 4A illustrates an example depiction of a HRTF model 400 for a user in a first head-torso orientation, in accordance with one or more embodiments. The HRTF model 400 depicts energy in decibels (dB) along the y-axis and frequency in kilohertz (kHz) along the x-axis. Note that, for simplicity, the HRTF model 400 is shown for a single azimuth and single elevation from the user. In actuality, the HRTF model 400 is more complex as the energy is a function of frequency, azimuth, and elevation. The HRTF model 400 comprises static components and dynamic components that are associated with the static components and dynamic components of the pose of the user. As described above with reference to FIG. 3, the static and dynamic components of the pose contribute to the determination of one or more filters (i.e., one or more filter parameter values) which are applied to the HRTF model. The static and dynamic components are illustrated on the HRTF model 400 with notches (e.g., notch 410, notch 420, and notch 430). The notches are determined by the one or more filters applied to the HRTF model. The notches depict frequency attenuation characteristics. Frequency attenuation characteristics include frequency location, width of a frequency band centered around the frequency location, and depth at the frequency location. For example, notch 420 and notch 430 relate to the static components (e.g., notch 420 relates to the ear shape of the user and notch 430 relates to the head size of the user). The frequency attenuation characteristics for notch 420 and notch 430, respectively, do not substantially change based on any changes in movement of the user. In some instances, there may be slight changes in frequency attenuation characteristics for notch 420 and notch 430 due to cross-coupling terms. In this same example, notch 410 is predominantly based on a dynamic component (e.g., the head-torso orientation of the user) of the pose of the user. The frequency attenuation characteristics for notch 410 may change based on any changes in movement of the user.

FIG. 4B illustrates an example depiction of a HRTF model 405 for the user in a second head-torso orientation, in accordance with the HRTF model 400 in FIG. 4A for the user. The HRTF model 405 is a version of the HRTF model 400 that has been dynamically updated for the user due to the user changing their head-torso orientation from a first position to a second position (i.e., a dynamic component of the pose of the user has changed). As discussed above with reference to FIG. 3, one or more filters have been applied to the HRTF model 400 based on the determined pose of the user (i.e., based on the static and dynamic components of the pose). As the dynamic components of the pose of the user changes, the HRTF model is updated (e.g., the HRTF model goes from the HRTF model 400 to the HRTF model 405). As can be seen in the HRTF model 405, notch 415 has been updated (i.e., notch 410 of the HRTF model 400 is updated to become notch 415 of the updated HRTF model 405). In this example, the user may have changed their head-torso orientation by changing their torso orientation and keeping their head orientation constant. The notch 415 has become deeper (i.e., a greater change in energy) at the same frequency location of notch 410. In this example, notches (i.e., notch 420 and notch 430) found in the mid and high frequency locations (e.g., at 2 kHz and greater) may experience less change than notches found in the low frequency locations (e.g., below 2 kHz).

In another example, the user may change their head-torso orientation by changing their head orientation and keeping their torso orientation constant. In this example (not shown), notches found in the low frequency locations (e.g., below 2 kHz) may experience less change than notches found in the mid and high frequency locations (e.g., at 2 kHz and greater). In another example, the user may change their head-torso orientation by changing both their head orientation and torso orientation. In this example, notches in various frequency locations may experience changes.

Process for Dynamically Customizing a HRTF Model

Figure 5:
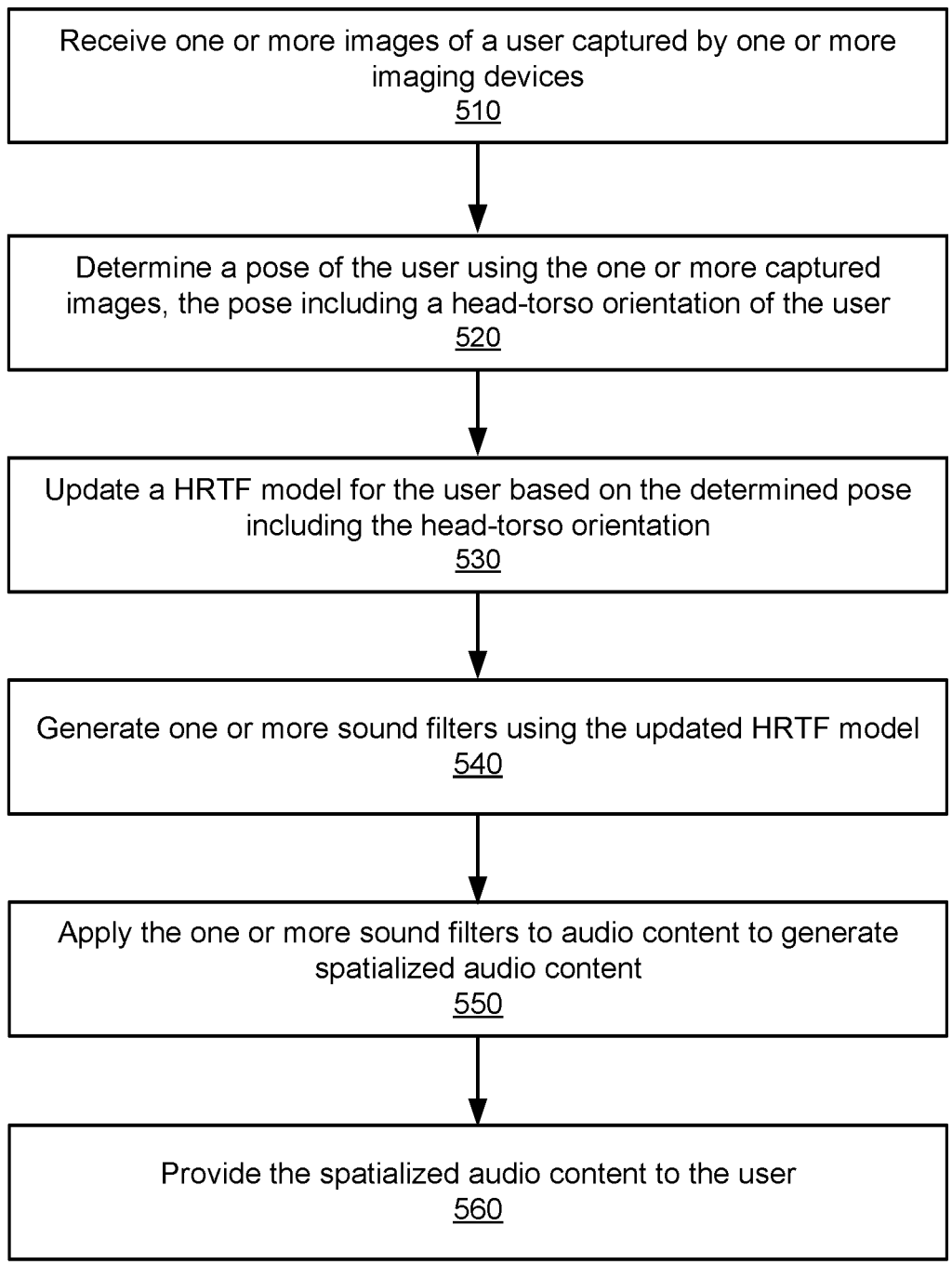
FIG. 5 is a flowchart illustrating a process for dynamically customizing a HRTF model, in accordance with one or more embodiments.

FIG. 5 is a flowchart illustrating a process for dynamically customizing a HRTF model 500, in accordance with one or more embodiments. The process shown in FIG. 5 may be performed by components of an audio system (e.g., the audio system 300). Other entities (e.g., the server 240) may perform some or all of the steps in FIG. 5 in other embodiments. Embodiments may include different and/or additional steps, or perform the steps in different orders.

The audio system receives 510 one or more images of a user captured by one or more imaging devices. For example, the audio system may receive one or more images and/or video of a torso and head of the user. In one embodiment, the one or more images and/or video may be captured by an imaging device integrated into a device that includes the audio system (e.g., a headset). In some embodiments, the one or more images and/or video may be captured by an imaging device separate from the audio system (e.g., a mobile device, a separate headset) in accordance with one or more privacy settings.

The audio system determines 520 a pose of the user using the one or more captured images. The pose of the user includes static and dynamic components. For example, a static component may be the head shape of the user and a dynamic component may be the head-torso orientation of the user. The dynamic components of the pose of the user may change over time. Image and/or video processing may be utilized to determine the static components and any changes in the dynamic components of the pose of the user.

The audio system updates 530 a HRTF model for the user based on the determined pose (i.e., based on static and dynamic components of the pose). The HRTF model is updated by applying one or more individualized filters to the HRTF model. A filter may be, e.g., a band pass, a band stop, a high pass, a low pass, a comb filter, or some combination thereof. The filters may include, e.g., one or more filter parameter values that are individualized to the user (i.e., individualized to a particular pose of the user). In one embodiment, a trained machine learning (ML) model may be used on the pose of a user to determine the individualized filter parameter values for one or more individualized filters that are customized to the user.

The audio system generates 540 one or more sound filters using the updated HRTF model. The sound filters cause the audio content to be spatialized, such that the audio content appears to originate from one or more target sound source directions.

The audio system applies 550 the one or more sound filters to audio content to generate spatialized audio content.

The audio system provides 560 spatialized audio content to the user. The spatialized audio content may be provided to the user via a transducer array (e.g., the transducer array 310).

Artificial Reality System Environment

Figure 6:
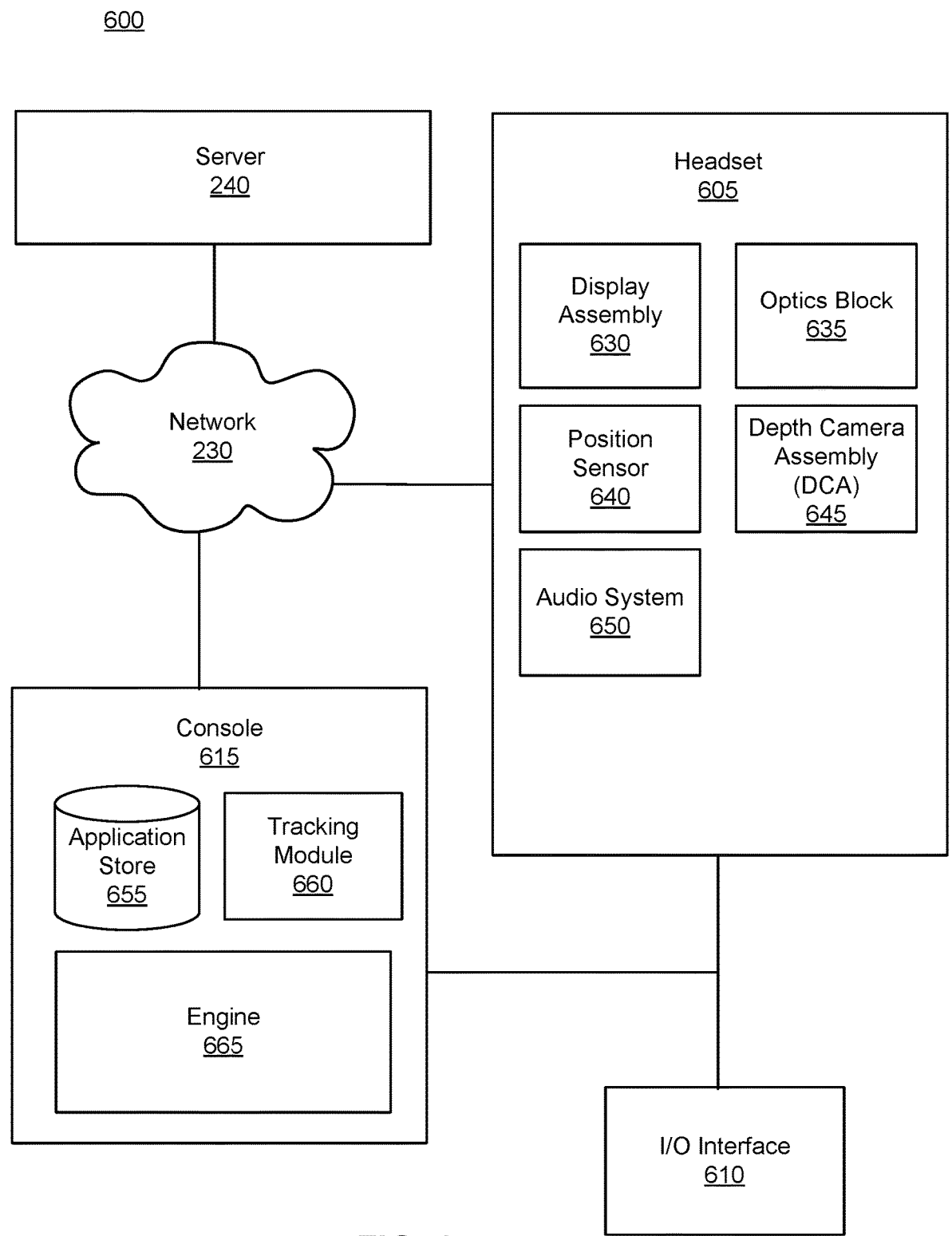
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 230, and the server 240. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, the DCA 645, and the audio system 650. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605. The estimated position of the headset 605 may include a head orientation of the user when the user is wearing the headset 605.

The DCA 645 generates depth information for a portion of the local area. The DCA includes one or more imaging devices and a DCA controller. The DCA 645 may also include an illuminator. Operation and structure of the DCA 645 is described above with reference to FIG. 1A.

The audio system 650 provides spatialized audio content to a user of the headset 605 using a dynamically updated HRTF model. The audio system 650 is substantially the same as the audio system 300 described above with reference to FIG. 3. The audio system 650 may comprise one or acoustic sensors, one or more transducers, and an audio controller. In some embodiments, the audio system 650 may receive a customized HRTF model from the server 240. In some embodiments, the audio system 650 may receive a template HRTF model from the server 240. The audio system 650 receives one or more images of the user captured by one or more imaging devices (e.g., the DCA 645). The audio system 650 determines a pose of the user using the captured images. The audio system may update the HRTF model (i.e., the template HRTF model and/or a customized HRTF model) based on the determined pose. The audio system 650 generates one or more sound filters using the updated HRTF model, and applies the sound filters to audio content to generate the spatialized audio content. The spatialized audio content appears to the user to be originating from a target sound source direction and/or target location when presented to the user. In some embodiments, the audio system may provide, in accordance with privacy settings, the updated HRTF model to the server 240 via the network 230.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 230 couples the headset 605 and/or the console 615 to the server 240. Operation and structure of the network 230 is described above with reference to FIG. 2.

The server 240 may include a database that stores data that may include, e.g., one or more template HRTF models, one or more customized HRTF models, individualized filters (e.g., individualized sets of filter parameter values), user profiles, feature data, other data relevant for use by the server system 240, or some combination thereof. The server 240 receives, from the headset 605 via the network 230, information describing at least a portion of the local area and/or location information for the local area. The user may adjust one or more privacy settings to allow or prevent the headset 605 from transmitting information to the server 240. The server 240 determines, based on the received information and/or location information, a location in the virtual model that is associated with the local area of the headset 605. The server 240 determines (e.g., retrieves) one or more acoustic parameters associated with the local area, based in part on the determined location in the virtual model and any acoustic parameters associated with the determined location. The server 240 may transmit the location of the local area and any values of acoustic parameters associated with the local area to the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an audio system, one or more images of a user captured by one or more imaging devices;
determining a pose of the user using the one or more captured images, the pose including a head-torso orientation of the user;
determining one or more individualized filters based in part on the determined pose of the user;
applying the one or more individualized filters to a head-related transfer function (HRTF) model to update one or more dynamic components of the HRTF model, the HRTF model including one or more dynamic components and one or more static components associated with a head geometry of the user, wherein at least one of the one or more static components of the HRTF model was previously updated by one or more previously determined individualized filters;
generating one or more sound filters using the HRTF model;
applying the one or more sound filters to audio content to generate spatialized audio content; and
providing the spatialized audio content to the user.

2. The method of claim 1, wherein at least one imaging device of the one or more imaging devices is integrated into a device that includes the audio system.

3. The method of claim 2, wherein the device is a headset.

4. The method of claim 1, wherein at least one imaging device of the one or more imaging devices is integrated into a device separate from the audio system.

5. The method of claim 1, wherein the one or more imaging devices capture at least one image of a reflection of the user, the at least one image of the reflection of the user is used in determining the pose of the user.

6. The method of claim 1, wherein determining the pose of the user is further based on using one or more measurements determined by an inertial measurement unit (IMU).

7. The method of claim 1, further comprising:
providing the HRTF model to a server, the server updates a template HRTF model based on the provided HRTF model.

8. The method of claim 1, further comprising:
detecting a change in the head-torso orientation in subsequent captured images; and
updating the one or more dynamic components of the HRTF model based at least in part on the detected change in the head-torso orientation.

9. The method of claim 1, wherein applying the one or more individualized filters to the HRTF model comprises:
applying a comb filter to the HRTF model, wherein one or more filter parameter values describing the comb filter are based on the head-torso orientation of the user.

10. An audio system comprising:
a transducer array configured to present spatialized audio content to a user;
a controller configured to:
receive one or more images of the user captured by one or more imaging devices;
determine a pose of the user using the one or more captured images, the pose including a head-torso orientation of the user;
determine one or more individualized filters based in part on the determined pose of the user;

apply the one or more individualized filters to a head-related transfer function (HRTF) model to update one or more dynamic components of the HRTF model, the HRTF model including one or more dynamic components and one or more static components associated with a head geometry of the user, wherein at least one of the one or more static components of the HRTF model was previously updated by one or more previously determined individualized filters;

generate one or more sound filters using the HRTF model;

apply the one or more sound filters to audio content to generate spatialized audio content; and provide the spatialized audio content to the user via the transducer array.

11. The audio system of claim 10, wherein at least one imaging device of the one or more imaging devices is integrated into a device that includes the audio system.

12. The audio system of claim 11, wherein the device is a headset.

13. The audio system of claim 10, wherein at least one imaging device of the one or more imaging devices is integrated into a device separate from the audio system.

14. The audio system of claim 10, wherein the one or more imaging devices capture at least one image of a reflection of the user, and wherein the controller determines the pose of the user based in part on the at least one image of the reflection of the user.

15. The audio system of claim 10, wherein the controller determines the pose of the user based on one or more measurements determined by an inertial measurement unit (IMU).

16. The audio system of claim 10, wherein the controller is further configured to:

provide the HRTF model to a server, the server updates a template HRTF model based on the provided HRTF model.

17. The audio system of claim 10, wherein the controller is further configured to:

update a static component of the one or more static components of the HRTF model, the static component comprises a function between an audio frequency output relative to an audio source spatial location, and wherein the function is updated according to an ear shape of the user.

18. The audio system of claim 10, wherein the controller is further configured to:

apply a comb filter to the HRTF model to modify one or more dynamic components of the HRTF, wherein one or more filter parameter values describing the comb filter are based on the head-torso orientation of the user.

19. The audio system of claim 10, wherein the controller is further configured to:

detect a change in the head-torso orientation in subsequent captured images; and update the one or more dynamic components of the HRTF model based at least in part on the detected change in the head-torso orientation.

20. A non-transitory computer readable medium configured to store program code instructions that, when executed by a processor, cause the processor to perform steps comprising:

receiving, at an audio system, one or more images of a user captured by one or more imaging devices;

determining a pose of the user using the one or more captured images, the pose including a head-torso orientation of the user;

determining one or more individualized filters based in part on the determined pose of the user;

applying the one or more individualized filters to a head-related transfer function (HRTF) model to update one or more dynamic components of the HRTF model, the HRTF model including one or more dynamic components and one or more static components associated with a head geometry of the user, wherein at least one of the one or more static components of the HRTF model was previously updated by one or more previously determined individualized filters;

generating one or more sound filters using the HRTF model;

applying the one or more sound filters to audio content to generate spatialized audio content; and providing the spatialized audio content to the user.

* * * * *